Aug. 25, 1959
J. W. COLTON
2,901,407
HYDROGEN CHLORIDE PURIFICATION
Filed July 31, 1957
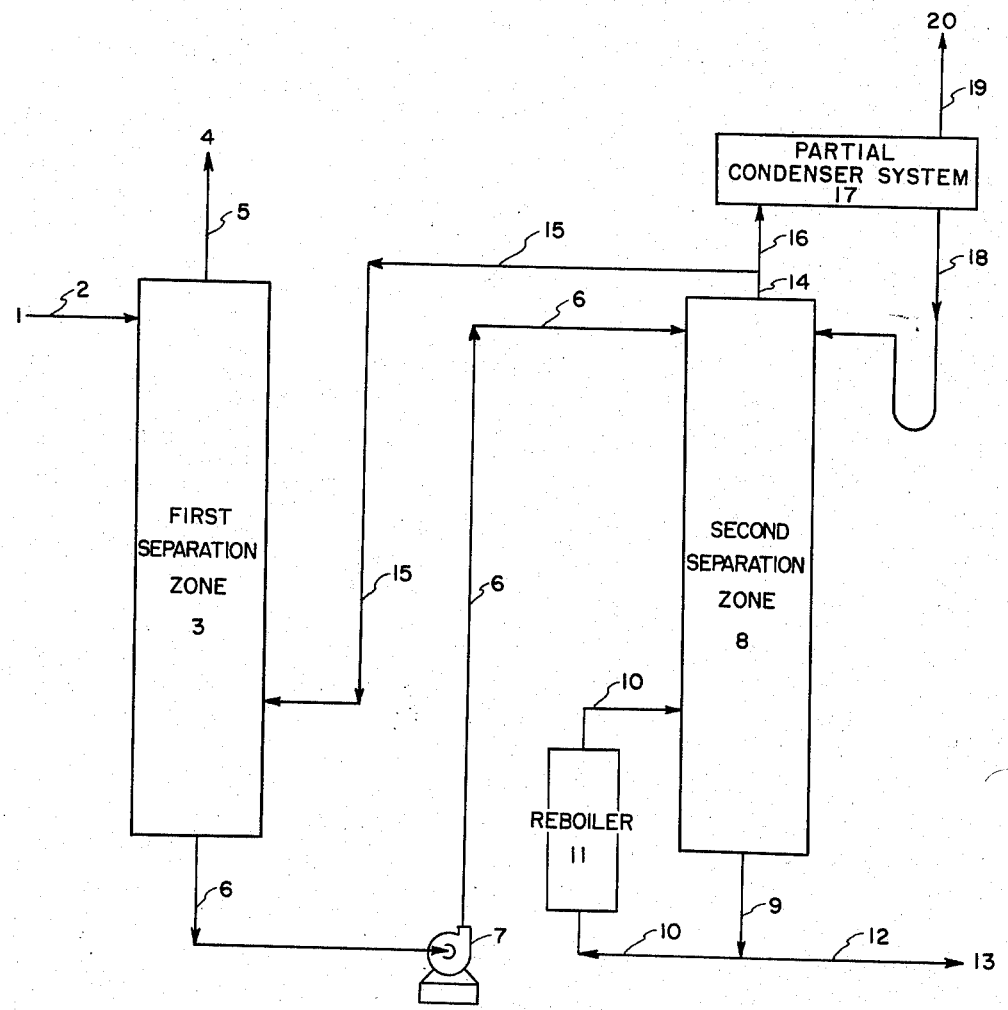
*INVENTOR.*
John W. Colton
BY
ATTORNEY + # United States Patent Office 2,901,407
Patented Aug. 25, 1959

2,901,407

HYDROGEN CHLORIDE PURIFICATION

John White Colton, Pelham Manor, N.Y., assignor, by mesne assignments, to Scientific Design Company, Inc., a corporation of Delaware Application July 31, 1957, Serial No. 675,422

6 Claims. (Cl. 202—42)

This invention relates to hydrogen chloride purification, particularly by separation. More particularly, this invention relates to a process for the manufacture of anhydrous hydrogen chloride having economic advantages over the prior art.

It is the object of the present invention to provide a process for the purification of hydrogen chloride wherein substantial savings are realized in both capital and operating costs.

In a preferred embodiment the invention comprises a cyclic process for the purification of a contaminated aqueous hydrochloric acid solution which comprises the steps of: passing said aqueous solution into a first separation zone, removing from said separation zone as separate streams hydrogen chloride vapor containing said contaminants and an aqueous hydrochloric acid effluent more concentrated with respect to hydrogen chloride than said contaminated aqueous hydrochloric acid solution, passing said effluent into a second separation zone maintained at a pressure higher than that maintained in said first separation zone, removing from said second separation zone as separate streams an aqueous hydrochloric acid solution of azeotropic concentration and a vapor effluent of hydrogen chloride and water, introducing a portion of said vapor effluent into said first separation zone sufficient to effect said separation in said first zone, separating the remaining portion of said vapor effluent into substantially anhydrous hydrogen chloride and aqueous hydrochloric acid solution.

The contaminants contained in the aqueous hydrochloric acid feed consist generally of chlorine and chlorocarbons such as carbon tetrachloride, perchloroethylene, methylene chloride, methyl chloride, and chloroform. The key contaminant is usually the least volatile contaminant in the aqueous hydrochloric acid solution and it is the most difficult one to strip to the desired product specification.

The invention has particular applicability to aqueous hydrochloric acid solutions obtained in the course of thermal chlorination of aliphatic hydrocarbons and in which processes there are produced aqueous hydrochloric acid solutions by virtue of the use of aqueous media for dissolving the hydrogen chloride by-product. These aqueous solutions contain such contaminants as set forth above.

The following detailed description taken in conjunction with the accompanying drawing will show that the purification art has been technically advanced according to the process of this invention.

The drawing is a diagrammatic illustration of one embodiment of the process of the instant invention.

Referring now to the drawing in detail: a contaminated aqueous hydrochloric acid solution 1 is fed through line 2 to a first separation zone 3, maintained at approximately atmospheric pressure. Hydrogen chloride containing said contaminants 4 is removed as overhead vapor through line 5. An aqueous hydrochloric acid effluent more concentrated with respect to hydrogen chloride than said original contaminated aqueous hydrochloric acid solution is removed through line 6 by pump 7 to a second separation zone 8 maintained at a pressure higher than that maintained in said first separation zone. An aqueous hydrochloric acid solution of azeotropic concentration is removed through line 9 from said second separation zone. A portion 10 is recycled to reboiler 11, and back to the separation zone. The remaining portion is removed through line 12 as liquid effluent 13 and may be used elsewhere in the process, for example, as a scrubbing medium.

Vapor effluent of hydrogen chloride and water is removed from separation zone 8 through line 14. A portion of this stream is introduced through line 15 into said first separation zone sufficient to effect said separation in said first zone, i.e. supply means to effect separation. The remaining portion of said vapor effluent is passed through line 16 into a partial condenser system 17, which consists of a first condenser operated with cooling water and a second condenser operated with refrigeration. An aqueous hydrochloric acid solution which is separated in the first condenser is returned to said second separation zone by line 18. Line 19 removes the desired substantially anhydrous hydrogen chloride product 20 from the refrigerated condenser. Condensate from the refrigerated condenser is returned to the second separation zone through line 18.

It will be apparent from a reading of the foregoing disclosure that the described process produces particular technical advantages over the prior art. For example, in the prior art method two reboilers are required, one for each of the separation zones whereas when operating according to the process of this invention only one reboiler is necessary, in the second separation zone. The economic advantage of this reboiler reduction can be seen when the total utilities, steam and cooling water, are assumed constant, for under these circumstances the prior art requires 60 percent more theoretical plates than the instant process, thereby increasing capital costs. Further, operating according to the prior art a 25° C. higher operating temperature is required at the bottom of the first separation zone thereby increasing the operating and maintenance difficulties which are inherent when operating apparatus such as distillation columns and pumps with aqueous hydrochloric acid at elevated temperatures.

In another comparison, the packed height of the second separation zone or hydrogen chloride stripper is assumed the same in both the prior art and the process of this invention. Under these circumstances the prior art method requires 20 percent more steam and 130 percent greater condenser load; in addition, the vapor effluent is less concentrated.

In still another comparison, the hydrogen chloride stripper reboiler heat duty is assumed the same. Under these circumstances the prior art requires 25 percent more steam, 180 percent more condenser load, and the concentration of the overhead hydrogen chloride vapor is approximately 18 percent lower.

Thus, it is apparent from a reading of the foregoing disclosure that the present invention provides a process for the purification of hydrogen chloride wherein substantial savings are realized in both capital and operating costs.

The minimum volume of vapor effluent that is required to be returned to the first separation zone is expressed by the following equation:

$$\frac{VK}{L} > 1$$

where $V$ = volume of stripping vapor (mols)

$L$ = volume of liquid (mols)

$K = \frac{y}{x}$ at equilibrium of key contaminant where $y$ is the concentration of key component in the vapor phase (mole fraction)

$x$ is the concentration of key component in the liquid phase (mole fraction)

The key contaminant is the most difficult one to strip to a specification concentration, and is usually the least volatile contaminant in the aqueous hydrochloric acid solution.

The maximum volume of vapor effluent that is returned to the first separation zone is controlled by the economics of the process and generally will not exceed 60 percent of the vapor effluent. A range of about 5 to 40 percent has been found to give satisfactory results, while 15 to 30 percent is preferred.

The following example is illustrative of the present invention but is not to be construed as limitative thereof.

*Example*

An aqueous hydrogen chloride solution containing about 33 percent hydrogen chloride and small amounts of contaminants resulting from quenching the reactor stream of a propane/propylene chlorinator process for the production of perchloroethylene and/or carbon tetrachloride is fed to a stripping column maintained at a pressure in the range 700 to 1,000 mm. of Hg and at 59° to 71° C. The vapor effluent from this column is a stream of hydrogen chloride containing about 5 percent water and the contaminants. The liquid effluent from said column is a 37 percent aqueous solution of hydrogen chloride and is fed to a second stripping column maintained at a pressure in the range 1,500 to 2,000 mm. Hg and at 84° to 135° C. The liquid effluent of the second column consists of an aqueous hydrochloric acid of about 21 percent hydrogen chloride content, which is near the azeotropic concentration. An approximately 25 percent portion of the vapor effluent from this second stripping column is returned to the first stripping column. The remaining portion is passed to the partial condenser system where aqueous hydrogen chloride is returned, after leaving the cooling water condenser, to the second stripping column and substantially anhydrous hydrogen chloride is recovered as product from the refrigerated condenser.

It will be realized that the portion of the vapor effluent returned to the first stripping column, rather than the approximately 25 percent set forth above, can be varied widely, such as for example, the range generally will not exceed 60 percent and 5 to 40 percent for satisfactory operation.

The desired operating pressure of the first separation zone is about 0.9 atmosphere to about 1.5 atmospheres with atmospheric pressure being preferred. The second separation zone is maintained at a pressure higher than that maintained in said first separation zone and is generally between about one and three atmospheres. Low pressures require recycling large volumes of the azeotrope mixture and increase the steam consumption. The upper pressure limit is governed by materials of construction and the economics of operation. A preferred operating range is about 10 to 20 p.s.i.g.

By means of the foregoing procedure it is possible to separate substantially anhydrous hydrogen chloride free of such objectionable contaminants as chlorine and chlorocarbons such as carbon tetrachloride, perchloroethylene, methylene chloride, methyl chloride and chloroform.

In view of the foregoing disclosures, variations and modifications thereof will be apparent to one skilled in the art and it is intended to include within the invention all such variations and modifications except as do not come within the scope of the appended claims.

I claim:

1. In a cyclic process for the purification of a contaminated aqueous hydrochloric acid solution, the steps of: passing said aqueous solution into a first separation zone, removing from said separation zone as separate streams hydrogen chloride containing said contaminants and an aqueous hydrochloric acid effluent more concentrated with respect to hydrogen chloride than said original contaminated aqueous hydrochloric acid solution, passing said effluent into a second separation zone maintained at a pressure higher than that maintained in said first separation zone, removing from said second separation zone as separate streams an aqueous hydrochloric acid solution of azeotropic concentration and a vapor effluent of hydrogen chloride and water, introducing a portion of said vapor effluent into said first separation zone sufficient to effect said separation in said first zone, separating the remaining portion of said vapor effluent into anhydrous hydrogen chloride and aqueous hydrochloric acid solution.

2. The process according to claim 1 wherein the pressure of said second separation zone is maintained between about one and three atmospheres absolute.

3. In a cyclic process for the purification of a contaminated aqueous hydrochloric acid solution, the steps of: passing said aqueous solution into a first stripping zone, removing from said stripping zone as separate streams hydrogen chloride containing said contaminants and an aqueous hydrochloric acid effluent more concentrated with respect to hydrogen chloride than said contaminated aqueous hydrochloric acid solution, passing said effluent into a second stripping zone maintained at a pressure higher than that maintained in said first stripping zone, removing from said second stripping zone as separate streams an aqueous hydrochloric acid solution of azeotropic concentration and a vapor effluent of hydrogen chloride and water, introducing a portion of said vapor effluent into said first stripping zone sufficient to effect said separation in said first stripping zone, separating the remaining portion of said vapor effluent into substantially anhydrous hydrogen chloride and aqueous hydrochloric acid solution and returning this aqueous hydrochloric acid solution to said second stripping zone.

4. The process according to claim 3 wherein the pressure of said second stripping zone is maintained between about one and three atmospheres absolute.

5. In a cyclic process for the purification of a contaminated aqueous hydrochloric acid solution, the steps of: passing said aqueous solution into a first stripping zone, removing from said stripping zone as separate streams hydrogen chloride containing said contaminants and an aqueous hydrochloric acid effluent more concentrated with respect to hydrogen chloride than said contaminated aqueous hydrochloric acid solution, passing said effluent into a second stripping zone maintained at a pressure higher than that maintained in said first stripping zone, removing from said second stripping zone as separate streams an aqueous hydrochloric acid solution of azeotropic concentration and a vapor effluent of hydrogen chloride and water, introducing less than about 60 percent of said vapor effluent into said first stripping zone, separating the remaining portion of said vapor effluent into substantially anhydrous hydrogen chloride and aqueous hydrochloric acid solution.

6. In a cyclic process for the purification of a contaminated aqueous hydrochloric acid solution, the steps of: passing said aqueous solution into a first stripping zone, removing from said stripping zone as separate streams hydrogen chloride containing said contaminants and an aqueous hydrochloric acid effluent more concentrated with respect to hydrogen chloride than said contaminated aqueous hydrochloric acid solution, passing said effluent into a second stripping zone maintained at a pressure higher than that maintained in said first stripping zone, removing from said second stripping zone as separate streams an aqueous hydrochloric acid solution of azeotropic concentration and a vapor effluent of hydrogen chloride and water, introducing from about 15 to 30% of said vapor effluent into said first stripping zone, separating the remaining portion of said vapor effluent into substantially anhydrous hydrogen chloride and aqueous hydrochloric acid solution.

References Cited in the file of this patent

UNITED STATES PATENTS

| | | |
|---|---|---|
| 2,366,361 | Semon et al. | Jan. 2, 1945 |
| 2,730,194 | Wohlers et al. | Jan. 10, 1956 |

OTHER REFERENCES

Brumbaugh et al.: "Synthesis and Recovery of Hydrogen Chloride Gas," "Industrial and Engineering Chemistry," vol. 41, October 1949, pp. 2165–2167.